J. P. B. FISKE.
ELECTRICAL CLAMP.
APPLICATION FILED OCT. 31, 1917.
1,352,948.
Patented Sept. 14, 1920.
2 SHEETS—SHEET 1.
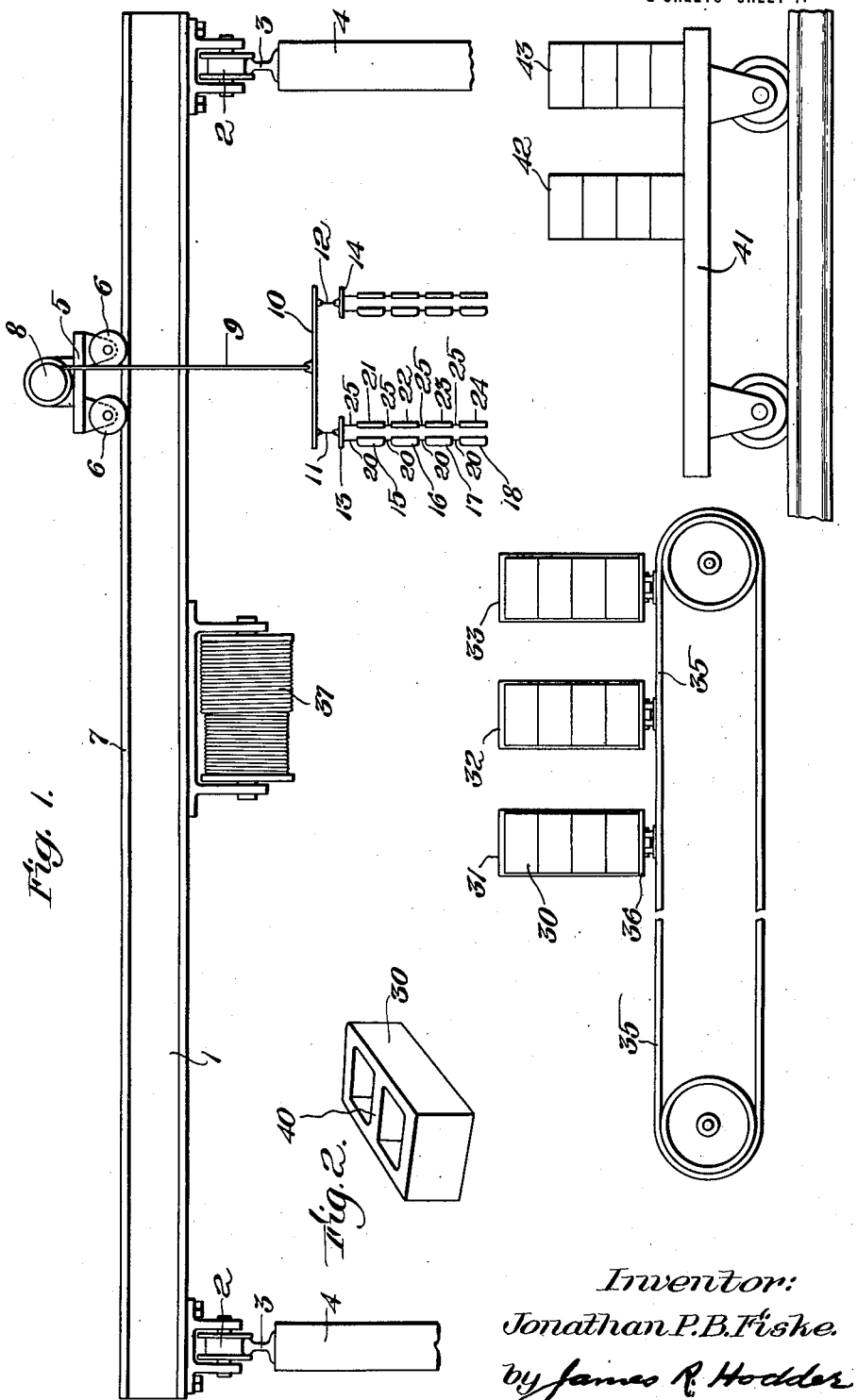
Inventor:
Jonathan P. B. Fiske.
by James R. Hodder
Attorney.

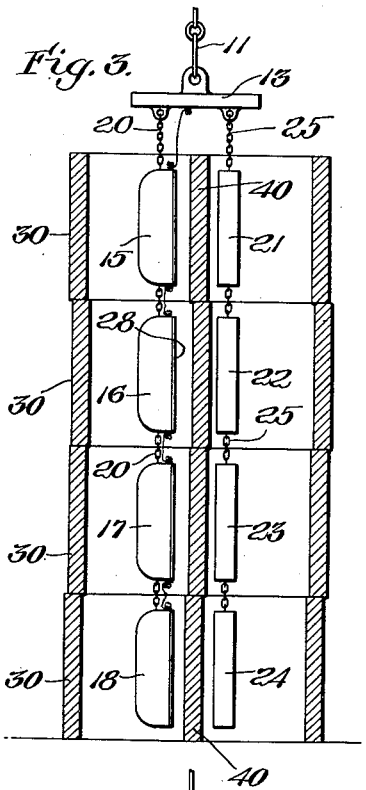
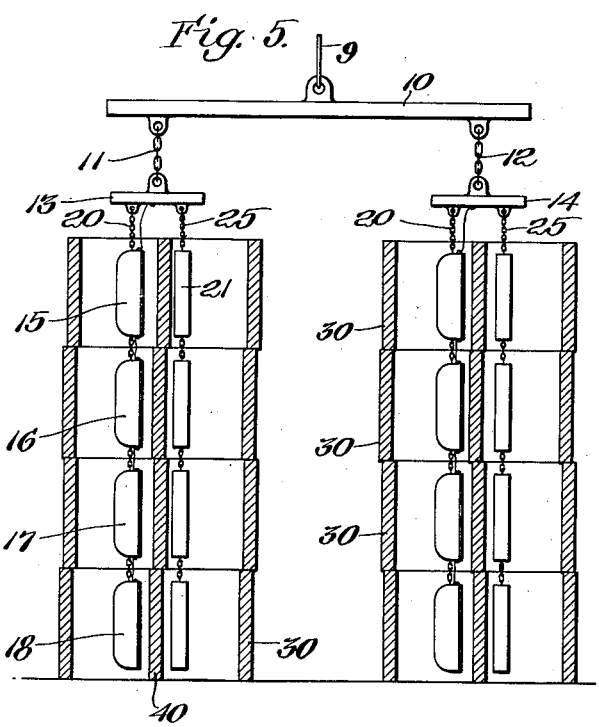
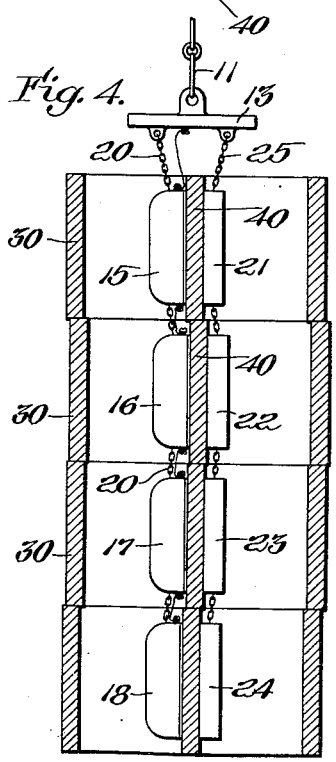
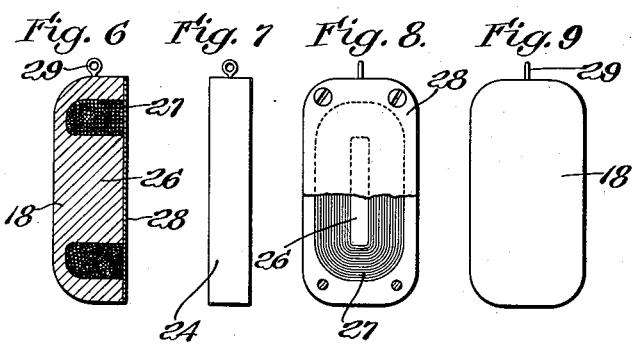

UNITED STATES PATENT OFFICE.

JONATHAN P. B. FISKE, OF NEWTON, MASSACHUSETTS.

ELECTRICAL CLAMP.

1,352,948.  Specification of Letters Patent.  Patented Sept. 14, 1920.

Application filed October 31, 1917. Serial No. 199,442.

*To all whom it may concern:*

Be it known that I, JONATHAN PARKER B. FISKE, a citizen of the United States, and resident of Newton, in the county of Middlesex and State of Massachusetts, have invented an Improvement in Electrical Clamps, of which the following description, in connection with the accompanying drawings, is a specification, like letters on the drawings representing like parts.

My present invention consists in an electrical clamping device, adapted particularly for lifting, transporting and setting down articles. The invention is particularly valuable in the manufacture of clay products, wherein it is desired to handle, automatically, such clay products, either while in a plastic state, or in stacked units by engaging the same from above, or for the automatic lifting and removal of such clay products during their continuous travel in connection with the system of their manufacture.

I have illustrated herein the application of my novel clamping device in connection with the manufacture of hollow brick or tile, the clamp herein specifically claimed being one of the features shown in my copending application Ser. No. 198,992, filed Oct. 29, 1917, and is advantageously employed in carrying out my novel process for handling clay products as therein explained. This novel clamping device consists in the utilization of a magnet capable of being energized or disenergized at will, suitable to engage and hold an article or articles to be lifted and transported by means of a clamping action about a portion of said articles, such for example, as about an interior web in a hollow tile. An important feature of the clamp consists in the automatic release, as soon as the current is turned off, whereby the clamping members are disengaged from the web of the tile which they clamp, and said members may then be freely withdrawn without injury or difficulty.

A still further important feature and advantage of the present clamp, when applied to a plurality of stacked hollow tile, consists in the fact that each tile is individually clamped, and by an equivalent clamping force on each tile, as well as by means which automatically adjust or seat the tile engaging faces upon each individual tile, irrespective of whether said articles are in alinement or disalinement. This is of special value in the automatic handling of stacked units of hollow tile, as illustrated in the accompanying drawings.

My clamp comprises a pair of members, one a magnet and the other a coöperating plate or keeper, normally adapted to be spaced from the magnet a greater width than the article or portion of the article to be engaged, so that the two members may be readily lowered into position, then the magnet energized sufficiently to draw the magnet and keeper toward each other with a clamping action of suitable extent to lift the clay article. Both clamp and keeper are flexibly suspended to permit such action, and a plurality of magnets and keepers may be thus flexibly connected to automatically engage disalined articles to be lifted thereby. Upon release of the energizing current, both magnet and keeper automatically drop away from the engagement with the clamped member and are suspended in spaced relation to permit the withdrawal of the clamp from said articles, whether alined or disalined, freely without injury, and as thus suspended are in position to be lowered into position over another stack of articles to be lifted.

Referring to the drawings, wherein I have illustrated my electrical clamp in connection with the process of manufacturing hollow brick or tile:

Figure 1 is a fragmentary view of an overhead crane, electrical clamp, and a plurality of stacked units in position on an off-bearing belt, together with a truck to which the stacked units are to be transferred for subsequent drying or kiln burning;

Fig. 2 is a perspective view of a typical type of hollow clay article for which my apparatus is especially adaptable;

Fig. 3 is an enlarged view of the clamp when lowered in position upon a vertical pile of clay articles;

Fig. 4 is a view partly in cross section of the clamp engaging said vertical pile;

Fig. 5 is a view partly in cross section of a clamp having a plurality of clamping members adapted to engage and lift simultaneously a plurality of vertically stacked units;

Figs. 6, 7, 8 and 9 are detail views of the clamp.

I have illustrated in Fig. 1, in conventional form, a traveling crane 1, suitable for installation in a brick making establishment, said crane being fitted with usual wheels, 2, 2, adapted to travel on rails 3, 3, on supports 4, 4, together with a suitable driving mechanism (not shown). The crane 1 may carry a car 5, having pairs of wheels 6, 6, adapted for movement lengthwise of the crane 1 on tracks 7. The car 5 carries suitable means 8 to wind up and lower a flexible support 9, carrying the clamp. As herein shown, where a plurality of stack engaging clamps are illustrated, I attach to the flexible support, chain, rope or the like 9, a member 10 from which is suspended by links 11 and 12, the clamped carrying rods 13 and 14 respectively. Each clamp rod has depending therefrom a plurality of magnets 15, 16, 17 and 18 (four being herein shown), the magnets being flexibly connected by chains or links 20, 20. Opposite each magnet in relatively similar position and adapted to coöperate therewith, is suspended from the clamp rod 13, metallic keepers 21, 22, 23 and 24, being respectively in position with the corresponding magnets 15, 16, 17 and 18. Flexible connections 25, 25, unite these keepers similar to those 20, uniting and suspending the magnets. Each magnet (see Figs. 6 and 8) is preferably made with a core 26, around which are the current receiving wires 27, and is covered by a plate 28 of magnetic material to prevent injury to the wires during the clamping action. Screw eyes 29 are positioned where required to engage the flexible links connecting and sustaining each magnet.

A plurality of bricks 30 are positioned in vertical stacked units, as indicated at 31, 32 and 33, traveling continuously on an offbearing belt 35. These stacked units 31, 32 and 33 may be carried on supports 36, as described in my said copending application. A suitable electrical source of power (not shown) with flexible connections through the car 5 to the clamping magnets, is provided. Automatic means are preferably provided to move the car 5 into position over a series of stacked units 31, 32 and 33, then arranged to travel therewith at the same rate of speed as that of the off-bearing belt 35. In this position the apparatus is actuated to lower the flexible support 9 so that the clamping magnets and their coöperating keepers will be lowered downwardly through the vertical stacked units, with said magnets and keepers spaced sufficiently to freely encompass an interior web 40 of the hollow brick 30, here shown as the middle web. The power is then thrown onto the magnets, sufficient to cause both magnets and keepers to clamp the web 40 of each clay article in each vertical stack with a sufficient force to lift the same, whereupon the entire clamp is lifted by winding up the member 9 and the clay articles are thus removed from the belt 35 and deposited on the car 41 as shown at 42 and 43, or to other desired position. It will be appreciated that a large number of such clamping members may be manipulated simultaneously to engage, lift and carry a sufficiently large number of the stacked units to insure ample time for the unloading of the units on the car 41 and the return of the traveling car 5 and its clamps to engage the next plurality of stacked members coming in line on the off-bearing belt 35, the return travel of the car 5 being much speedier than that of its forward travel, which must correspond to that of the belt 35.

My novel clamping device thus presents a simple, efficient and economical apparatus, especially adapted for positioning about an article, or a plurality of articles, in stacked columns, whether alined or disalined, which must be handled from an overhead device. The flexible connections supporting each magnet and the coöperating keepers also flexibly connected, permit each individual magnet and keeper to be seated upon an article intended to be engaged by it, as the middle web of a hollow tile, irrespective of the alinement, and yet with equal clamping and lifting force, and with equal efficiency. As soon as the magnets are released, the line of magnets and line of keepers being normally suspended from each other for a space greater than that of the web, automatically separate the clamping apparatus from the article engaged and permits ready detachability.

My invention is further described and defined in the form of claims as follows:

1. An electrical clamping apparatus of the kind described, comprising a supporting member, a pair of coöperating magnetic members flexibly united to said support, the coöperating members being normally spaced from each other, and means to magnetize said coöperating members to clamp an article between them.

2. An electrical clamping apparatus of the kind described, comprising a support, a magnet flexibly united to said support, and a coöperating attractable member, also flexibly supported, and means to energize said magnet and attract said coöperating attractable member, to clamp an article between them.

3. Clamping apparatus of the kind described, comprising a plurality of magnets, flexibly connected to each other, a plurality of corresponding coöperating plates, also flexibly connected to each other, and adapted to engage and clamp a non-magnetic article between them.

4. Electrical clamping apparatus, comprising a support, a plurality of magnets suspended from said support, a plurality of coöperating keepers also suspended from said support and normally spaced from said magnets, whereby said magnets and keepers are adapted to be lowered about an article or articles to be engaged thereby, means supporting said magnets and means supporting said keepers, whereby a relative movement toward each other is created upon energizing of the magnets.

5. Electrical clamping apparatus of the kind described, comprising a plurality of magnets flexibly connected to a support, a plurality of coöperating keepers similarly connected to a support, each magnet and keeper being flexibly connected to each other to engage and clamp a non-magnetic member which can be in a different vertical plane from that engaged by an adjacent magnet and keeper.

6. Electrical clamping apparatus of the kind described, comprising a plurality of magnets flexibly united, a plurality of coöperating keepers each flexibly suspended, each magnet and keeper being adapted to engage and clamp one non-magnetic member of a plurality of members in a different vertical plane from that engaged by an adjacent magnet and keeper, and means to energize all of said magnets simultaneously, whereby they will clamp said disalined articles.

In testimony whereof, I have signed my name to this specification, in the presence of two subscribing witnesses.

JONATHAN P. B. FISKE.

Witnesses:
JAMES R. HODDER,
HAROLD J. CLARK.